ANNA M. SUYDAM.
GARDEN-RAKE.
No. 183,603. Patented Oct. 24, 1876.
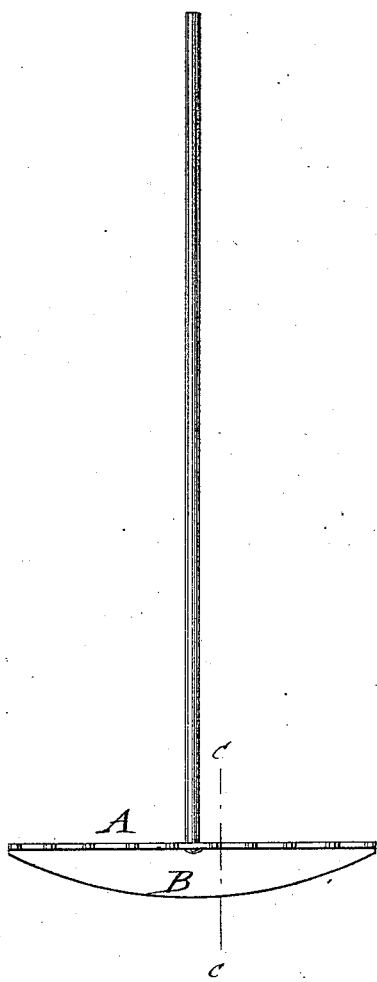
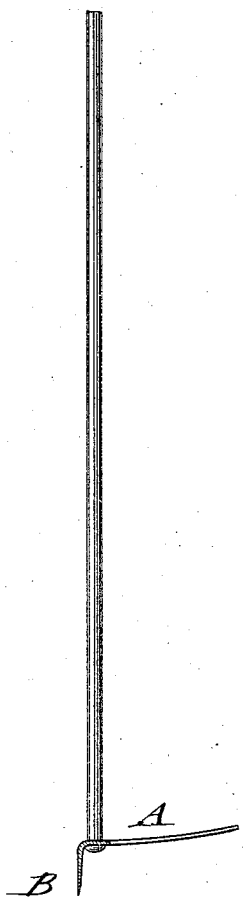
WITNESSES:
INVENTOR: Mrs. Anna Maria Suydam
BY
ATTORNEYS.

UNITED STATES PATENT OFFICE.

ANNA MARIA SUYDAM, OF WATERLOO, NEW YORK.

IMPROVEMENT IN GARDEN-RAKES.

Specification forming part of Letters Patent No. 183,603, dated October 24, 1876; application filed July 1, 1876.

*To all whom it may concern:*

Be it known that I, ANNA M. SUYDAM, of Waterloo, in the county of Seneca, and in the State of New York, have invented a new and Improved Garden-Rake, of which the following is a specification:

In the accompanying drawing, Figure 1 represents a front view, and Fig. 2 a vertical transverse section, of my improved garden-path rake on line C C, Fig. 1.

Similar letters of reference indicate corresponding parts.

The invention will first be described in connection with the drawing, and then pointed out in the claim.

In the drawing, A represents a garden-path rake, with the usual tines, for raking up the grass in garden-walks. A blade, B, of segmental shape, with sharp edge, is bent in one piece with the tines, and forms a stiffening-back for the same. It is made in line with the handle, and at about a right angle to the tines, and serves to clean and cut away the small patches of grass and bits of weed that are left in hoeing in the garden-paths.

When raking, the rake is merely turned over, and pushed back to cut off the grass and weeds left by the hoe, saving thereby the dropping of the rake, and taking up of the hoe. The blade is widest at the center, and diminishes gradually toward the ends, serving also as a grass edge tool, and for other purposes, and forming a handy and convenient improvement to the common rake.

The cutter B is free from end lips, and has its edge in line with handle, as well as convexed, so as to trim the borders of walks.

Having thus described my invention, what I claim as new, and desire to secure by Letters Patent, is—

A border-cutter, B, convex on the edge, free from end lips, and in line with handle, substantially as shown and described.

ANNA MARIA SUYDAM.

Witnesses:
 J. B. CROCKER,
 JOHN A. SUYDAM.